(12) United States Patent
Luo et al.

(10) Patent No.: US 8,079,291 B2
(45) Date of Patent: Dec. 20, 2011

(54) FASTENER FEEDER WITH FASTENER SIZE SCREENING

(75) Inventors: Yuan Luo, Shenzhen (CN); Hu-Dong Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 665 days.

(21) Appl. No.: 12/277,235

(22) Filed: Nov. 24, 2008

(65) Prior Publication Data

US 2010/0000374 A1 Jan. 7, 2010

(30) Foreign Application Priority Data

Jul. 3, 2008 (CN) .................. 2008 2 0301431 U

(51) Int. Cl.
*B25B 17/00* (2006.01)
*B25B 23/00* (2006.01)
*B23Q 7/12* (2006.01)
*B65H 9/00* (2006.01)

(52) U.S. Cl. ............. 81/57.37; 81/433; 81/435; 81/426; 81/452; 221/18; 221/168; 221/165; 221/162; 221/180; 221/242; 221/141; 221/158; 221/159; 221/172; 221/278; 221/68; 221/264

(58) Field of Classification Search .............. 81/433, 81/435, 57.37, 436, 452; 221/18, 168, 165, 221/162, 180, 242, 141, 158, 159, 172, 278, 221/68, 264

See application file for complete search history.

(56) References Cited

U.S. PATENT DOCUMENTS

| 4,222,495 | A | * | 9/1980 | Kaneko | 221/68 |
| 4,416,172 | A | * | 11/1983 | Medinger | 81/57.37 |
| 4,528,874 | A | * | 7/1985 | Dunn | 81/57.37 |
| 4,732,296 | A | * | 3/1988 | Heck et al. | 221/172 |
| 4,748,877 | A | * | 6/1988 | Watanabe | 81/433 |
| 4,821,877 | A | * | 4/1989 | Aab et al. | 206/338 |
| 5,857,587 | A | * | 1/1999 | Ota | 221/242 |
| 5,975,350 | A | * | 11/1999 | Han | 221/232 |
| 6,257,394 | B1 | * | 7/2001 | Takahashi et al. | 198/530 |
| 6,431,036 | B1 | * | 8/2002 | Obermeier | 81/434 |
| 7,802,710 | B1 | * | 9/2010 | Hung | 227/120 |
| 2003/0075023 | A1 | * | 4/2003 | Robichaux | 81/57.37 |
| 2010/0018354 | A1 | * | 1/2010 | Kuboyama | 81/57.37 |

FOREIGN PATENT DOCUMENTS

CN 2776916 Y 5/2006

* cited by examiner

*Primary Examiner* — Gene O. Crawford
*Assistant Examiner* — Rakesh Kumar
(74) *Attorney, Agent, or Firm* — Altis Law Group, Inc.

(57) ABSTRACT

An exemplary fastener feeder includes a pair of guiders, a slot cover and a blocker. The guiders define a sliding slot therebetween. Each guider includes a sloped part and a level part, bodies of the fasteners are capable of being received in the sliding slot, and a head of each fastener is capable of sliding down from the sloped parts and stopping on the level parts. The slot cover defines an opening for providing a path through which a fastener pickup device can pass through and engage with a fastener located on the level parts. The blocker is located below the level parts. When the fastener pickup device moves the fastener head engaged therewith away from the opening and a length of the fastener is greater than a distance between the blocker and the level parts, the fastener is blocked by blocker and disengaged from the fastener pickup device.

20 Claims, 4 Drawing Sheets

FASTENER FEEDER WITH FASTENER SIZE SCREENING

BACKGROUND

1. Technical Field

The disclosure relates to fastener feeders such as screw feeders and, specifically, to a fastener feeder comprising a blocker that can screen out unwanted fasteners.

2. Description of Related Art

In manufacturing, fasteners such as screws are commonly used when assembling products. To speed production, screw feeder machines are employed. Typically, a worker obtains a screw from a screw feeder and applies the screw to the product with an electric screwdriver. In loading screw feeders, mishaps can occur where similar but different screws are accidentally loaded into the same screw feeder and the worker is unaware of the situation. In such case, the worker may damage the product when the worker applies the wrong screw to the product with the electric screwdriver.

Therefore, it is desirable to provide a fastener feeder that can overcome the shortcomings described.

DETAILED DESCRIPTION OF EMBODIMENTS

Figure 1:
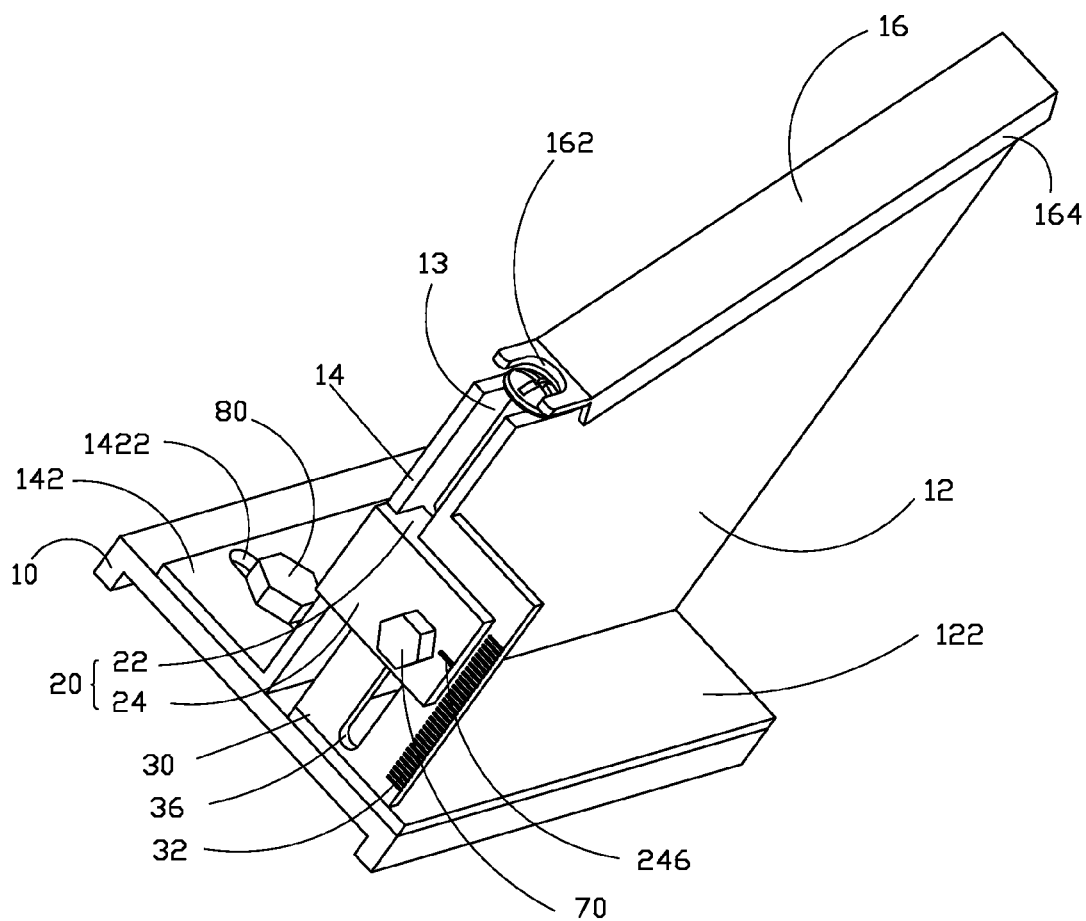
FIG. 1 is a perspective view of a screw feeder in accordance with an exemplary embodiment of the present invention, the screw feeder loaded with a plurality of screws (only one visible).
Figure 2:
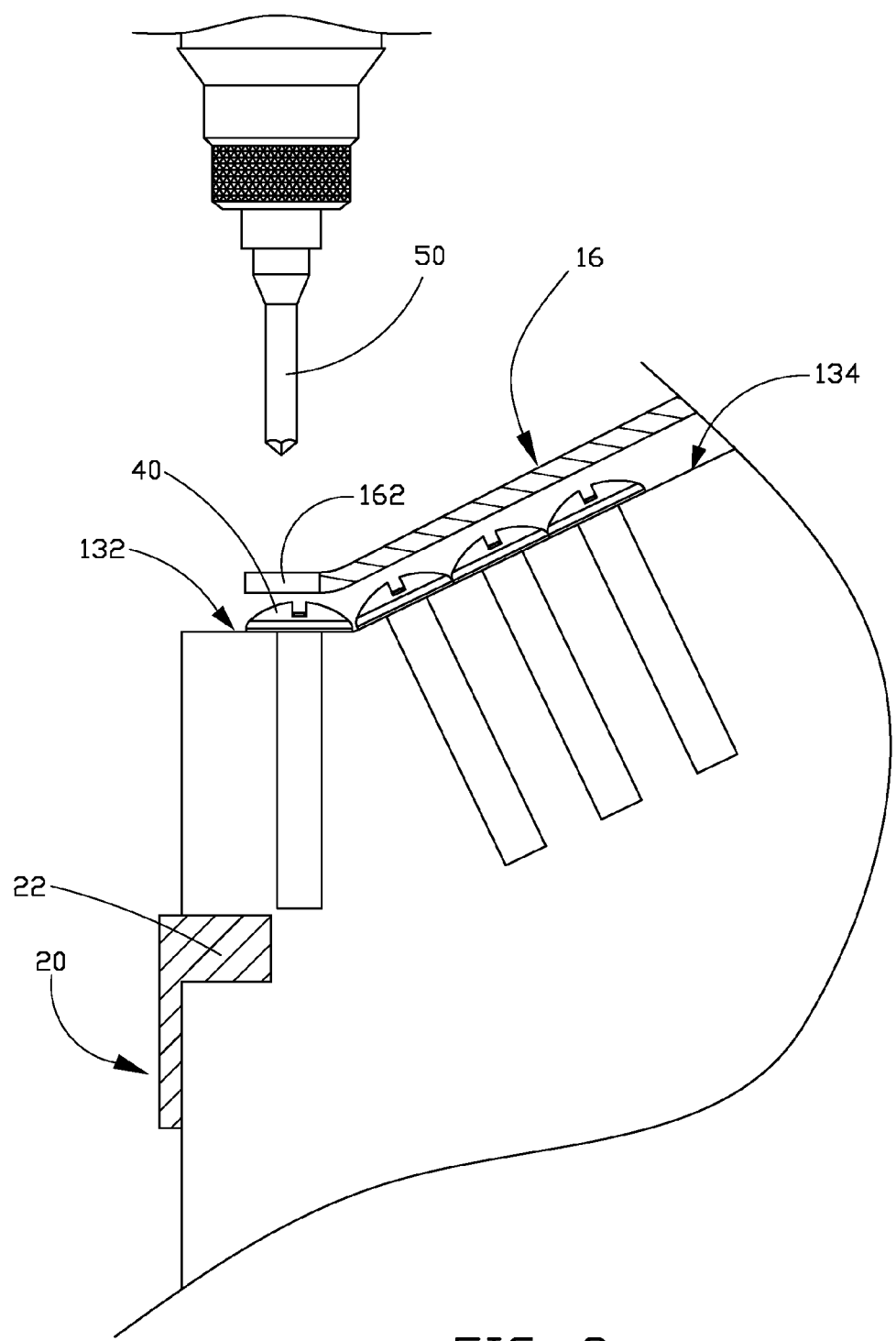
FIG. 2 is an enlarged, side cut-away view of part of FIG. 1, also showing a screwdriver.

Referring to FIG. 1 and FIG. 2, an exemplary screw feeder for screening out unwanted screws comprises a pair of guiders 12, 14 parallel with each other. The guiders 12, 14 comprise a fixing portion 122, 142 respectively, by which the guiders 12, 14 are connected to a base 10. A sliding slot 13 is cooperatively defined by the pair of guiders 12, 14, for automatically feeding a plurality of screws 40. In other examples, the screws 40 may instead be other kinds of fasteners, such as bolts, rivets, and so on. In such examples, the screw feeder is a fastener feeder, and is configured for screening out unwanted fasteners.

Each of the guiders 12, 14 further comprises a sloped part 134 and a level part 132. The screws 40 slide down along the sloped parts 134 under force of gravity, and a bottommost one of the screws 40 stops on the level parts 132, thereby automatically feeding the bottommost screw to a position where it can be picked up with a screwdriver 50. In one embodiment, the sloped parts 134 are gently sloped. For example, an angle between the sloped parts 134 and the horizontal direction may be less than 45 degrees. The sloped parts 134 are configured so that the screws 40 slide down slowly and the bottommost screw stops on the level parts 134 without falling off therefrom. In a typical application, the screws 40 are metallic and a head of the screwdriver 50 is magnetized. The screwdriver 50 may be operated by a human user or by a robot. In other examples, when there is a fastener feeder used for other kinds of fasteners such as bolts, rivets, and so on, a suitable fastener pickup device is used with the fastener feeder to pick up the fasteners.

In this embodiment, the fixing portion 122 of the guider 12 is connected to the base 10 by welding, riveting, or screwing, etc. The fixing portion 124 of the guider 14 defines at least one first guiding slot 1422 extending along a direction perpendicular to the sliding slot 13. The fixing portion 124 is fixed on the base 10 via at least one fastener such as a bolt 80, which passes through the first guiding slot 1422 and is threadedly engaged in the base 10. The guider 14 can be moved back and forth along the extending direction of the first guiding slot 1422 to adjust a distance between the two guiders 12, 14. Thereby, a width of the sliding slot 13 is adjustable so that it matches the diameter of screws currently used, in this case the screws 40.

A slot cover 16 is configured above the sliding slot 13. The slot cover 16 comprises a pair of fixing parts 164 fixed on the guiders 12, 14, respectively. In this embodiment, the fixing parts 164 vertically extend from two opposite long sides of a main elongated body of the slot cover 16, and are welded (or screwed) to the guiders 12, 14. The elongated body of the slot cover 16 is parallel with top edges of the guiders 12, 14. A distance between the elongated body of the slot cover 16 and the top edges of the guiders 12, 14 is greater than a height of screw heads of the screws 40, thereby providing appropriate space for guided movement of the screw heads of the screws 40. An opening 162 is defined in one end of the elongated body of the slot cover 16. The opening is located above a bottom end of the sliding slot 13 that is between the level parts 132 of the guiders 12, 14. The opening 162 is sized for receiving the screwdriver 50 therethrough, so that the screwdriver 50 can engage with the head of the bottommost screw 40. In addition, the size of the opening 162 is less than that of the screw head of each screw 40, for preventing the bottommost screw 40 from being picked up vertically by the screwdriver 50. In other words, once the screwdriver 50 is engaged with the bottommost screw 40, the bottommost screw 40 can initially only be moved along a horizontal direction until the screw head is clear of the slot cover 16.

Figure 3:
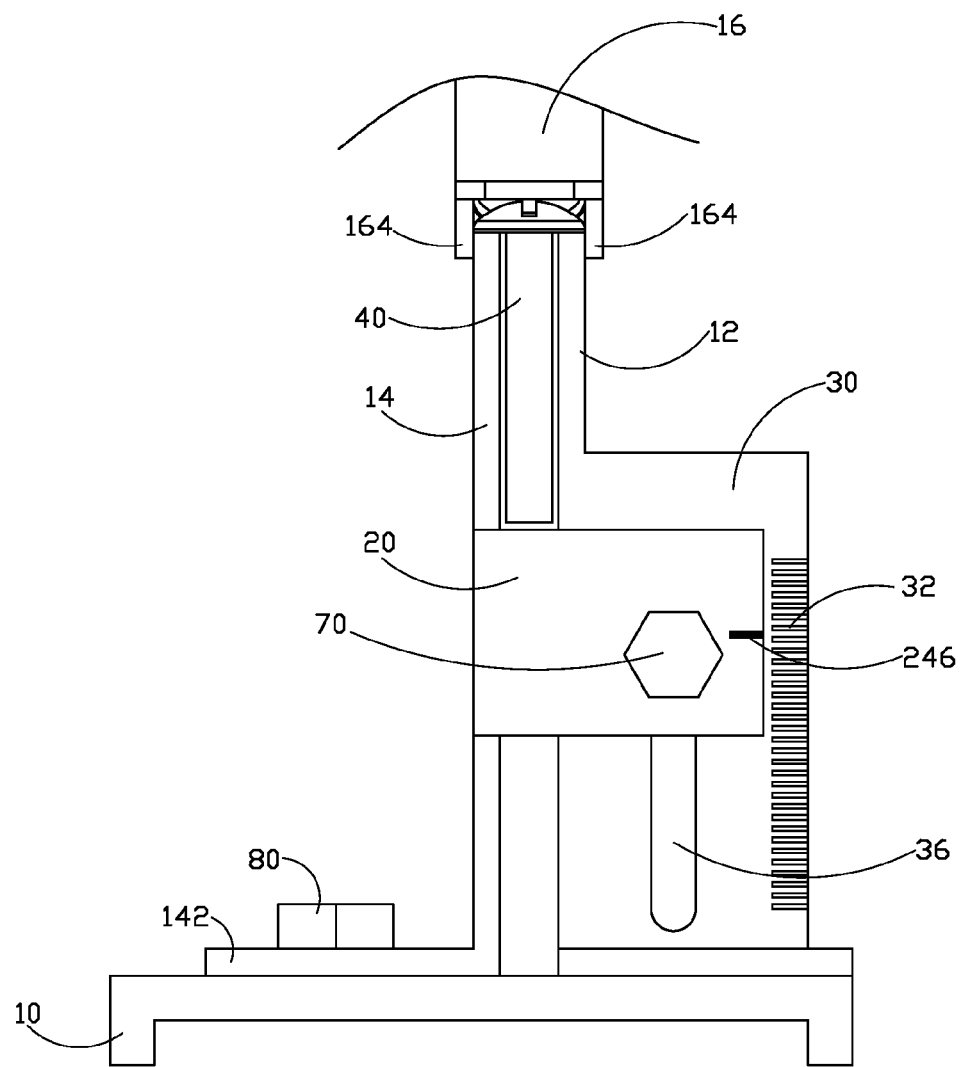
FIG. 3 is a front plan view of FIG. 1.

Referring to FIG. 1 and FIG. 3, one of the guiders 12, 14 comprises a fixing board 30 located below the level parts 132. In this embodiment, the fixing board 30 extends from the guider 12. The fixing board 30 defines a second guiding slot 36 extending along a vertical direction. A vertical scale 32 is provided on the fixing board 30 adjacent to and parallel with the second guiding slot 36. The scale 32 serves as an indicator of screw length. A length of the second guiding slot 36 is substantially equal to that of the scale 32. In this embodiment, the fixing board 30 is integrally formed with and vertical to the guider 12.

Figure 4:
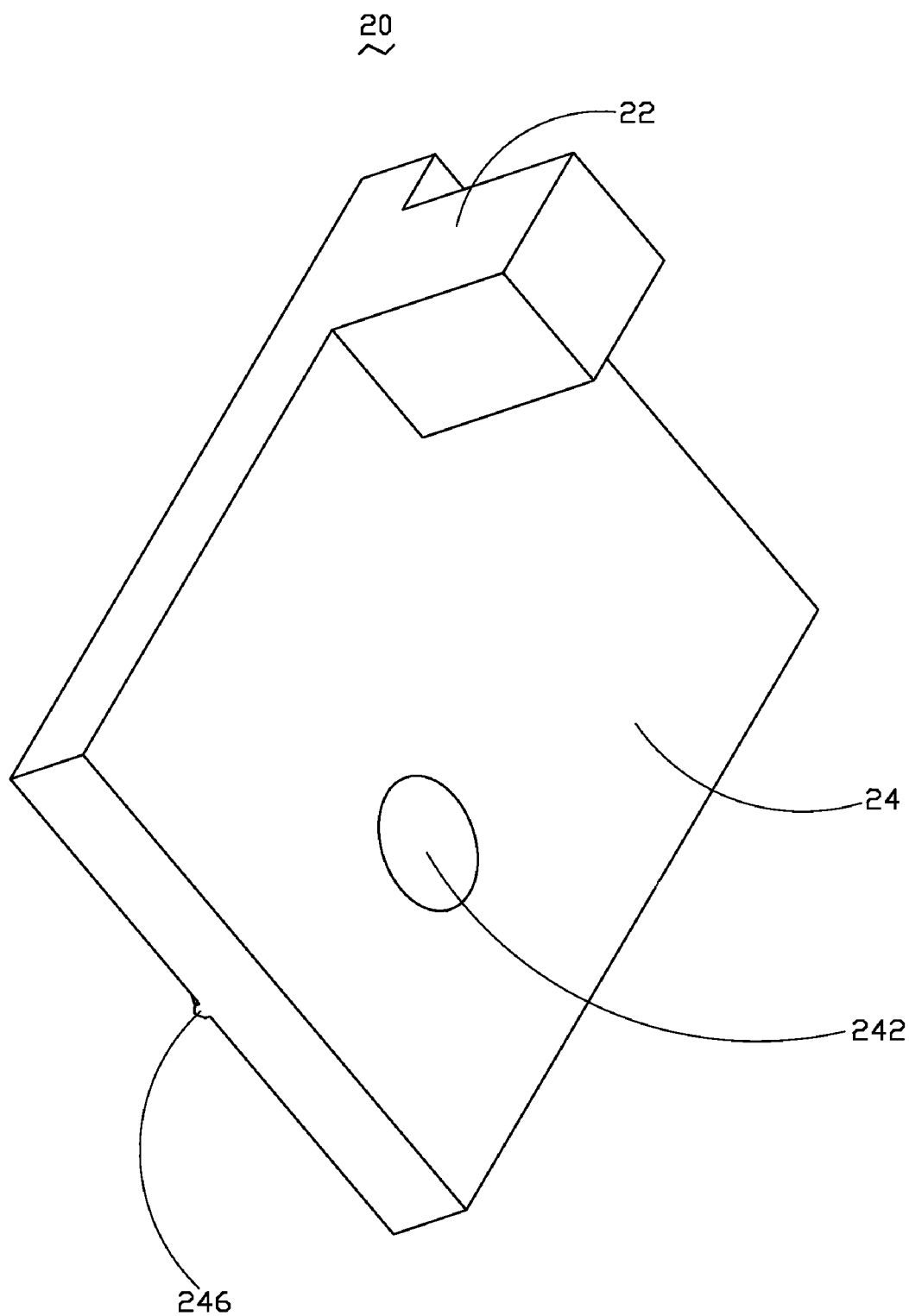
FIG. 4 is an enlarged, perspective view of a blocker of the screw feeder of FIG 1.

Referring also to FIG. 4, a blocker 20 is connected to the fixing board 30, and can be moved up and down along the direction of the second guiding slot 36. The blocker 20 comprises a stopper portion 22 and a connection portion 24. The connection portion 24 defines a through hole 242 and comprises a pointer 246. The pointer 246 is adjacent to the scale 32, and together with the scale 32 serves as an indicator for a predetermined desired screw length. The blocker 20 is fixed on the fixing board 30 via a fastener such as a bolt 70 passing through the through hole 242 and the second guiding slot 36 and engaging with a nut (not shown). The stopper portion 22 integrally formed on the connection portion 24 extends into an end of the sliding slot 13 which is directly below the level parts 132 of the guiders 12, 14. The blocker 20 can be moved up and down along the second guiding slot 36, in order to obtain a desired distance between the stopper portion 22 and the level parts 132.

When a screw 40 slides down to the level parts 132, the screwdriver 50 is passed through the opening 162 and engages with the screw 40. The screwdriver 50 with the screw 40 then moves horizontally away from the slot cover 16. If the screw 40 is longer than the distance between the stopper portion 22 and the level parts 132, the screw 40 is blocked by the stopper portion 22 and disengages from the screwdriver 50 and falls away. Therefore any screw 40 with a length exceeding the distance between the stopper portion 22 and the level parts 132 cannot be picked out from the screw feeder by the screwdriver 50.

While various embodiments have been described, it should be understood that they have been presented by way of example only and not by way of limitation. The breadth and scope of the disclosure should not be limited by the described exemplary embodiments, but only in accordance with the following claims and their equivalents.

What is claimed is:

1. A fastener feeder comprising:
a pair of guiders defining a sliding slot therebetween, each guider comprising a sloped part and a level part, wherein the sliding slot is capable of receiving bodies of fasteners therein, and the sloped parts and the level parts are configured such that a head of each fastener is capable of sliding down from the sloped parts and stopping on the level parts;
a slot cover above the sliding slot, the slot cover defining an opening located corresponding to the level parts, the opening providing a path through which a fastener pickup device can pass and engage with the head of a fastener located on the level parts, a size of the opening being less than that of the head of each fastener; and
a blocker located below the level parts of the guiders;
wherein a distance between the blocker and the level parts is such that when the fastener pickup device moves the fastener head engaged therewith away from the opening and a length of the fastener is greater than the distance between the blocker and the level parts, the fastener is blocked by the blocker and disengaged from the fastener pickup device.

2. The fastener feeder of claim 1, wherein the pair of guiders are parallel with each other.

3. The fastener feeder of claim 2, further comprising a base, wherein each guider comprises a fixing portion by which the guider is connected to the base.

4. The fastener feeder of claim 3, wherein a distance between the guiders is adjustable so that the sloped parts and the level parts are capable of selectively supporting fastener heads having different sizes.

5. The fastener feeder of claim 4, wherein one of the fixing portions defines at least one first guiding slot extending perpendicularly to the sliding slot, and at least one bolt passes through the first guiding slot and engages in the base such that said one of the fixing portions is capable of being adjustably fixed on the base.

6. The fastener feeder of claim 1, wherein the blocker comprises a connection portion movably fixed to one of the guiders and a stopper portion extending from the connection portion and disposed below the level parts of the guiders.

7. The fastener feeder of claim 6, wherein the blocker is vertically movable such that the distance between the blocker and the level parts is adjustable.

8. The fastener feeder of claim 7, wherein one of the guiders comprises a fixing board, the fixing board defines a second guiding slot along a vertical direction, the connection portion of the blocker defines a through hole, and the blocker is movably fixed on the fixing board via a bolt passing through the through hole and the second guiding slot.

9. The fastener feeder of claim 8, wherein the fixing board defines a scale parallel with the second guiding slot, and the connection portion comprises a pointer that points to the scale.

10. The fastener feeder of claim 9, wherein a length of the second guiding slot is substantially equal to that of the scale.

11. A fastener feeder comprising:
a pair of guiders defining a sliding slot therebetween, each guider comprising a sloped part and a level part, wherein the sliding slot is capable of receiving bodies of fasteners therein, and the sloped parts and the level parts are configured such that a head of each fastener is capable of sliding down from the sloped parts and stopping on the level parts;
a slot cover above the sliding slot, the slot cover defining an opening located corresponding to the level parts, the opening providing a path through which a fastener pickup device can pass and engage with the head of a fastener located on the level parts, the fastener head engaged with the fastener pickup device only being movable out from its position on the level parts in a substantially horizontal direction; and
a blocker located below the level parts of the guiders;
wherein a distance between the blocker and the level parts is adjustable such that when the fastener pickup device moves the fastener head engaged therewith out from its position on the level parts, the body of the fastener passes directly over at least part of the blocker when the fastener has a predetermined acceptable length, or the body of the fastener is blocked by the blocker and disengaged from the fastener pickup device when the fastener has a length greater than the predetermined acceptable length.

12. The fastener feeder of claim 11, wherein the blocker comprises a connection portion movable fixed to one of the guiders and a stopper portion extending from the connection portion and disposed below the level parts of the guiders.

13. The fastener feeder of claim 12, wherein the blocker is vertically movable for such that the distance between the blocker and the level parts is adjustable.

14. The fastener feeder of claim 13, wherein one of the guiders comprises a fixing board, the fixing board defines a second guiding slot along a vertical direction, the connection portion of the blocker defines a through hole, and the blocker is movable fixed on the fixing board via a bolt passing through the through hole and the second guiding slot.

15. The fastener feeder of claim 14, wherein the fixing board defines a scale parallel with the second guiding slot, and the connection portion comprises a pointer that points the scale.

16. The fastener feeder of claim 15, wherein a length of the second guiding slot is substantially equal to that of the scale.

17. A mechanism for providing fasteners and selecting out any fasteners that have an unwanted length, the mechanism comprising:
a pair of guiders defining a sliding slot therebetween, each guider comprising a sloped part and a level part, wherein the sliding slot is capable of receiving bodies of fasteners therein, and the sloped parts and the level parts are configured such that a head of each fastener is capable of sliding down under force of gravity from the sloped parts and stopping on the level parts;
a slot cover above the sliding slot, the slot cover defining an opening located corresponding to the level parts, the opening providing a path through which a fastener pickup device can pass and engage with the head of a fastener located on the level parts, the head of the fastener engaged with the fastener pickup device only being movable out from its position on the level parts in a substantially horizontal direction; and a blocker located below the level parts of the guiders;

wherein a distance between the blocker and the level parts is adjustable such that when the fastener pickup device moves the head of the fastener engaged therewith out from its position on the level parts and a length of the body of the fastener is greater than a selected distance between the blocker and the level parts, the body of the fastener is blocked by the blocker and the fastener is disengaged from the fastener pickup device.

18. The mechanism of claim 17, further comprising a fixing board extending from one of the guiders and configured for fixing the blocker, the fixing board defining a second guiding slot along a vertical direction, and a scale parallel with the second guiding slot.

19. The mechanism of claim 18, wherein the blocker comprises a connection portion movable fixed to the fixing board and a stopper portion extending from the connection portion and disposed below the level parts of the guiders.

20. The mechanism of claim 19, wherein the connection portion of the blocker defines a through hole, and the blocker is movable fixed on the fixing board via a bolt passing through the through hole and the second guiding slot, and the connection further comprises a pointer that points to the scale.

* * * * *